(12) United States Patent
Spielvogel et al.

(10) Patent No.: US 9,879,533 B2
(45) Date of Patent: Jan. 30, 2018

(54) SPRING RETURN APPARATUS FOR AN AXIAL PISTON MACHINE OF SWASH PLATE DESIGN FOR ELASTICALLY PRESTRESSING SLIDING PADS AGAINST THE SWASH PLATE, AND AXIAL PISTON MACHINE HAVING A SPRING RETURN APPARATUS OF THIS TYPE

(71) Applicant: Robert Bosch GmbH, Stuttgart (DE)

(72) Inventors: Christian Spielvogel, Eutingen (DE); Manuel Sell, Horb (DE); Martin Zug, Hirrlingen (DE); Timo Nafz, Horb (DE)

(73) Assignee: Robert Bosch GmbH, Stuttgart (DE)

( * ) Notice: Subject to any disclaimer, the term of this patent is extended or adjusted under 35 U.S.C. 154(b) by 665 days.

(21) Appl. No.: 14/200,105

(22) Filed: Mar. 7, 2014

(65) Prior Publication Data
US 2014/0265079 A1 Sep. 18, 2014

(30) Foreign Application Priority Data

Mar. 12, 2013 (DE) .................. 10 2013 204 217
Aug. 7, 2013 (DE) .................. 10 2013 215 501

(51) Int. Cl.
*F01B 3/00* (2006.01)
*F16F 1/18* (2006.01)
*F16F 1/32* (2006.01)

(52) U.S. Cl.
CPC .......... *F01B 3/0082* (2013.01); *F01B 3/0073* (2013.01); *F16F 1/185* (2013.01); *F16F 1/324* (2013.01)

(58) Field of Classification Search
CPC ........ F01B 3/0002; F01B 3/0076; F04B 1/12; F04B 1/14; F04B 1/2092
(Continued)

(56) References Cited

U.S. PATENT DOCUMENTS 2,093,477 A * 9/1937 Parsons .................. F02M 41/08
417/269
2,620,738 A * 12/1952 Huber ..................... F04B 1/126
74/60
(Continued)

FOREIGN PATENT DOCUMENTS

DE 299 21 501 U1 3/2000

*Primary Examiner* — Thomas E Lazo
*Assistant Examiner* — Matthew Wiblin
(74) *Attorney, Agent, or Firm* — Maginot, Moore & Beck LLP

(57) ABSTRACT

A spring return apparatus for elastically prestressing sliding pads against a sliding bearing face of an axial piston machine. The sliding pads are positioned on working pistons mounted axially movably in cylinders of a cylinder barrel that drives a drive shaft including a spring plate and a supporting plate. The spring plate includes a ring region surrounding a central opening, and levers extending radially from the ring region. The levers are arranged spaced apart or distributed uniformly in the circumferential direction, and are elastically flexible and/or elastically pivotable in the axial direction. Every two adjacent levers delimit a receiving region for receiving a tapered section of a working piston or a sliding pad. The supporting plate has a circular ring-shaped supporting region configured to support radially outer end sections of the levers if the supporting plate is arranged concentrically with respect to and axially adjacently to the spring plate.

17 Claims, 12 Drawing Sheets

(58) Field of Classification Search
USPC ............. 91/499; 92/12.2, 57, 71, 129; 74/60
See application file for complete search history.

(56) References Cited

U.S. PATENT DOCUMENTS

| | | | | |
|---|---|---|---|---|
| 3,383,930 | A * | 5/1968 | Hauser-Bucher | F01B 3/0088 74/60 |
| 3,584,514 | A * | 6/1971 | Hamma | F01B 3/007 74/60 |
| 5,046,403 | A * | 9/1991 | Riedhammer | F01B 3/0041 74/60 |
| 5,730,042 | A * | 3/1998 | Engel | F04B 1/126 417/269 |
| 5,862,704 | A * | 1/1999 | Seljestad | F04B 1/2085 74/60 |
| 6,352,017 | B1 * | 3/2002 | Ryuh | F04B 1/2078 92/129 |

\* cited by examiner

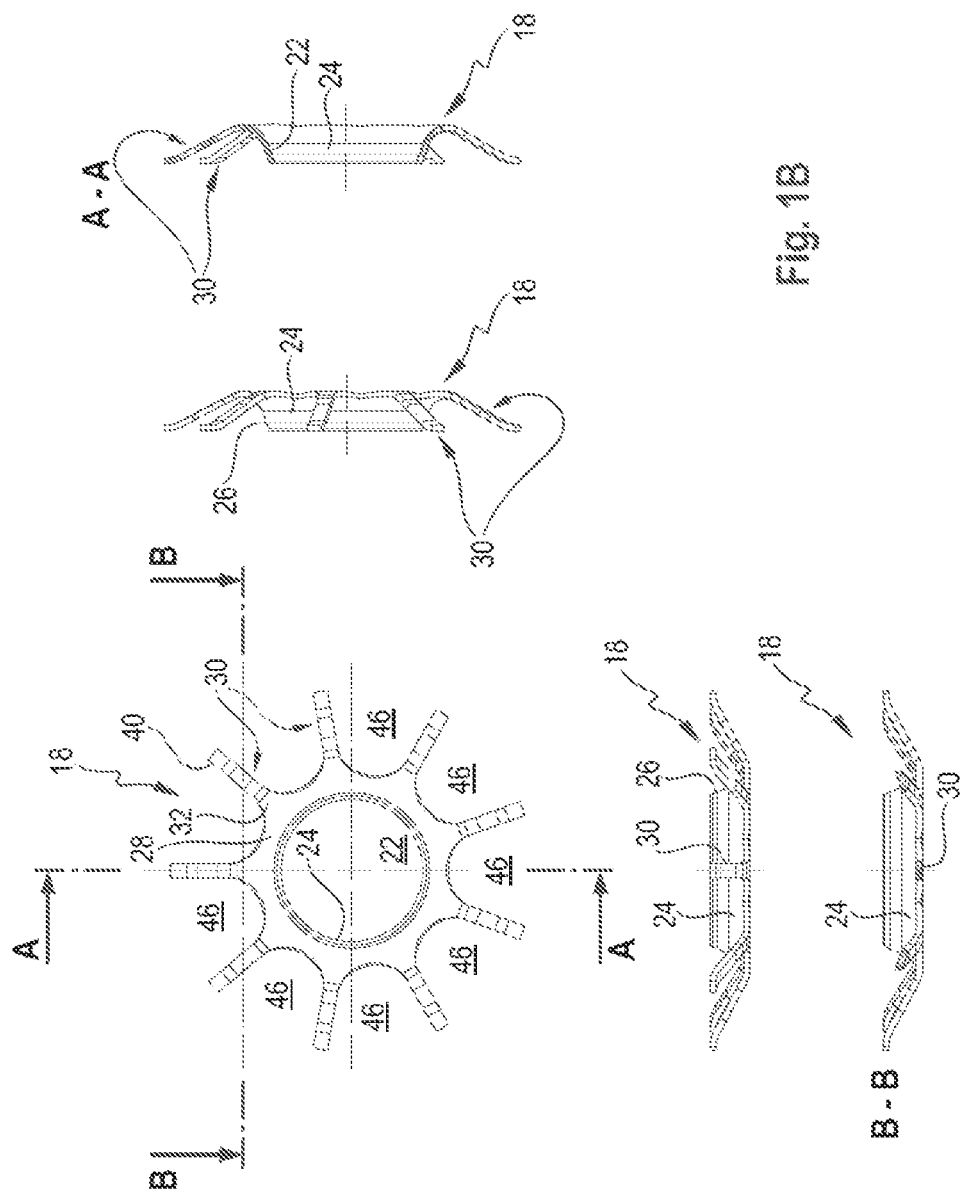

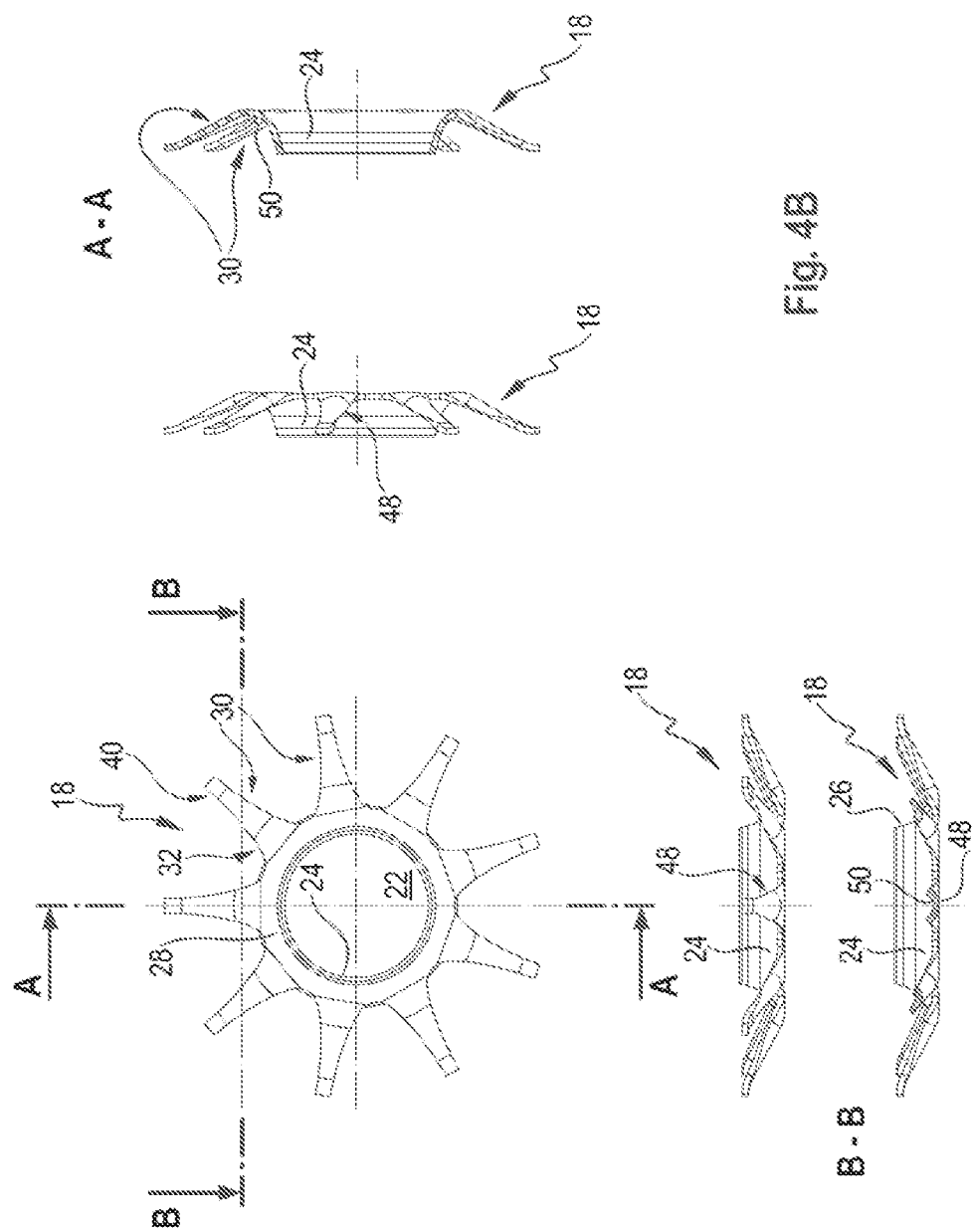

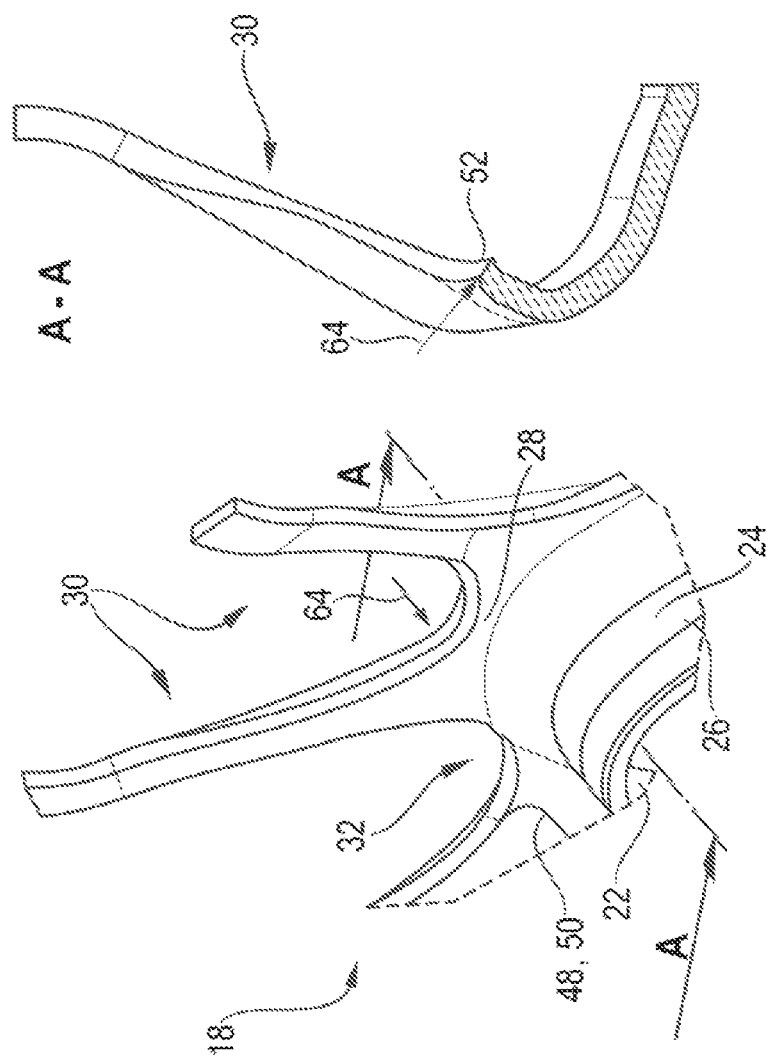

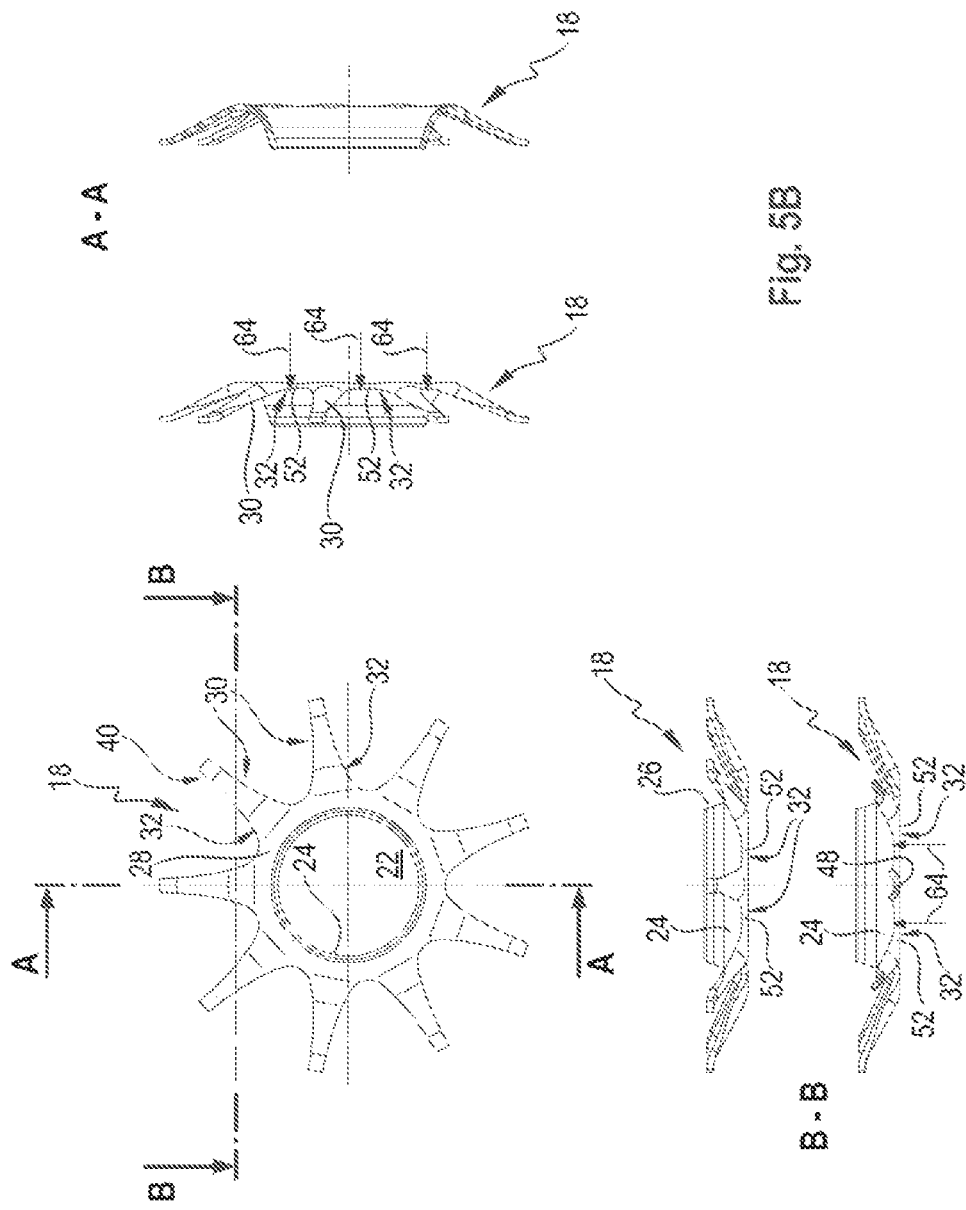

SPRING RETURN APPARATUS FOR AN AXIAL PISTON MACHINE OF SWASH PLATE DESIGN FOR ELASTICALLY PRESTRESSING SLIDING PADS AGAINST THE SWASH PLATE, AND AXIAL PISTON MACHINE HAVING A SPRING RETURN APPARATUS OF THIS TYPE

This application claims priority under 35 U.S.C. § 119 to patent application no. DE 10 2013 204 217.5, filed on Mar. 12, 2013 in Germany, and to patent application no. DE 10 2013 215 501.8, filed on Aug. 7, 2013 in Germany, the disclosures of which are incorporated herein by reference in their entirety.

The disclosure relates to a spring return apparatus for an axial piston machine.

BACKGROUND

Known axial piston machines of swash plate design comprise a cylinder barrel which is connected fixedly to a drive shaft so as to rotate with it having a multiplicity of cylinder bores which are formed therein, in which a multiplicity of working pistons are guided axially displaceably, and a pivotably mounted pivot cradle which has a swash plate on its side which faces the cylinder barrel, on which swash plate sliding pads are supported in a sliding manner, which sliding pads are provided on foot-side end sections of the working pistons. Single-part spring return apparatuses are known for prestressing the sliding pads against the swash plate. The spring return plate which is disclosed in DE 29921501 U1 comprises a base plate with a central opening and a multiplicity, corresponding to the number of working pistons or sliding pads, of sliding pad holding sections which are arranged spaced apart identically in the circumferential direction. Each sliding pad holding section comprises a radially outwardly extending lower section with a lower opening, an upper section which is arranged parallel to the lower section and extends radially inwardly with an upper opening and a bent section which connects the lower section and the upper section to one another in such a way that the upper section is elastically flexible or pivotable in relation to the lower section on account of the elasticity of the bent section. Here, the lower opening and the upper opening have a common axis and are designed such that a tapered section of a working piston and/or sliding pad extends through the upper and the lower opening in an installed state of the spring return plate. The production of said known spring return plate comprises a multiple-stage stamping and bending process and is therefore complicated and expensive.

SUMMARY

The object on which the present disclosure is based is to provide a spring return apparatus which, in order to achieve a comparable effect, is of simple construction and is correspondingly simple and inexpensive to produce.

In order to achieve the object, a spring return apparatus is provided for elastically prestressing a multiplicity of sliding pads against a sliding bearing face of a pivotably mounted pivot cradle of an axial piston machine, which sliding pads are provided on the piston feet of working pistons which are mounted axially movably in cylinders of a cylinder barrel of the axial piston machine, which cylinder barrel is connected fixedly to a drive shaft so as to rotate with it.

According to the disclosure, the spring return apparatus has a two-part construction comprising a spring plate and a supporting plate which can be arranged offset axially with respect to the spring plate. The spring plate comprises a central opening, a ring region which surrounds said opening, and a multiplicity of levers or brackets or arms which extend radially to the outside at least in sections from the ring region. The levers or brackets or arms are arranged spaced apart or distributed uniformly in the circumferential direction and are elastically flexible and/or elastically pivotable in the axial direction. In each case two adjacent levers can delimit a receiving region for receiving a tapered section of a working piston or sliding pad which is arranged on a piston foot. As an alternative, the arms can also be spaced apart from the tapered sections which are arranged in between. Or the brackets are penetrated by in each case one sliding pad. In the two last principle variants, the supporting plate bears against the sliding pads, in order to stress them with respect to the swash plate. According to the disclosure, the levers or brackets or arms are configured in order to stress the supporting plate against the swash plate. The supporting plate comprises a supporting region, on which radially outer end sections of the levers or brackets or arms can be supported if the supporting plate is arranged concentrically with respect to and axially adjacently to the spring plate. The supporting region can also be divided into corresponding part regions by the through recesses for the sliding pads. As a result of the two-part construction, the complicated, multiple-stage bending process is dispensed with during the production of the spring return apparatus according to the disclosure in comparison with the spring return plate which is disclosed in DE 29921501 U1 and was described at the outset, in which complicated, multiple-stage bending process, for each sliding pad holding section, the upper section is bent by an angle of up to or virtually approximately 180° in relation to the lower section and the bent section is formed. Instead, the spring plate of the spring return apparatus according to the disclosure can be produced from a semi-finished product in the form of a spring sheet plate substantially by way of only one stamping step for forming the shape and optionally a bending step for forming an optional bend of the levers or brackets or arms in the axial direction.

The opening in the spring plate is provided so that the drive shaft of the axial piston machine extends axially through it. Here, the ring region can comprise an edge region which is arranged radially on the inside, surrounds the opening, is configured as a bearing face and is designed to be supported on a bearing face of the cylinder barrel of the driving mechanism of the axial piston machine, which bearing face is concentric and is preferably configured in sections as spherical surface. The spring plate can thus be centered relatively simply with regard to the cylinder barrel. The bearing face can be formed on a neck of the cylinder barrel.

Each receiving region can be designed to receive a tapered section of a working piston or sliding pad which is arranged on a piston foot. Each lever can thus extend radially to the outside between two adjacent tapered sections of the working piston or the sliding pad. In this way, the levers can engage in the tapered sections and, in the case of an axial displacement of the working pistons or their sliding pads, can load the respective working piston or sliding pad with an elastic restoring force.

At least one lever of the spring plate can be bent out of a plane of the ring region in the axial direction toward the supporting plate. All the levers of the spring plate are preferably shaped in this way. In this way, against an axially adjacently arranged supporting plate, only radially outer sections of the levers bear against the supporting plate, and the supporting plate can be prestressed elastically in the axial direction relative to the spring plate if the supporting plate comes coaxially so close to the spring plate that the levers are bent in the axial direction and are therefore prestressed by the supporting plate.

The supporting plate can comprise a multiplicity of driving regions which extend radially to the inside from the supporting region, in each case two driving regions which are adjacent in the circumferential direction delimiting a circular segment-shaped free region. Each free region can be designed such that a sliding pad can extend axially through it, it being possible for each driving region to extend radially to the inside into an intermediate space between two adjacent sliding pads. The free regions ensure in each case space for receiving a section of a working piston or sliding pad.

Each receiving region can be configured substantially in the form of a "U", and the levers can form the limbs of the "U" here. Each receiving region can thus readily receive a tapered section of a working piston and/or sliding pad. The spring plate can also be mounted readily on a cylinder barrel which is fitted with working pistons, by each lever being arranged in the circumferential direction between two adjacent working pistons.

At least one lever can have a tapered section, the width (measured in the circumferential direction) of the lever in the tapered section being smaller than the width (measured in the circumferential direction) of the lever in the radially outer end section of the lever. All the levers are preferably configured in this way and have a tapered section. As a result of the tapered sections, the contours of the levers as viewed in the axial direction are adapted in an improved manner to the contours of the working pistons which are in each case of round cross section perpendicularly with respect to the axial direction, and in each case adjacent levers can achieve a more intimate engagement with a tapered section of a working piston or sliding pad. As a result of the tapering of the levers, the spring force of the levers can also be changed in relation to bending in the axial direction or can be set to a desired magnitude.

A multiplicity of grooves which extend in the radial direction and are arranged spaced apart or distributed uniformly in the circumferential direction can be formed in the circularly annular supporting region of the supporting plate. Here, each groove is configured to receive a radial end section of a lever of the spring plate. Here, an external diameter of the supporting plate can be smaller than an external diameter of the spring plate which is defined by the outer ends of the levers. If, in the assembled state of the spring return apparatus, each groove of the supporting plate has received an end section of a lever of the spring plate, the supporting plate is driven reliably in the case of a rotation of the spring plate around the axial direction, and rotates together with the spring plate.

Each lever can have a radially inner transition section to the ring region. Here, a punched bead which extends in the radial direction can be formed in at least one transition section. A punched bead of this type is preferably formed in all transition sections. The punched bead preferably extends at least in sections along the respective lever. As an alternative or in addition to this, each lever can have a cross-sectional area in the form of a preferably axially symmetrical circular ring section in its transition section in a plane perpendicularly with respect to the radial direction, the inner circle section of the circular ring section being arranged on that side of the spring plate which faces the supporting plate. As a result of a punched bead and/or the design of the transition section which is bent into the shape of a circular ring section, the elasticity or the spring force of a lever can be changed in relation to bending of the lever in the axial direction or can be set to a desired magnitude. The mechanical stresses which are produced during operation can also therefore be controlled, in particular with regard to the location and the strength of the stressing, with the result that it can therefore be achieved that permissible or predefined mechanical maximum stresses are not exceeded in the spring return apparatus. The embodiments with a punched bead and/or with the design of the transition section of the lever which is bent in the form of a circular ring section make it possible to find a satisfactory compromise between the spring force which is to be applied and the strength of the spring plate.

Each lever can have a cross-sectional area in the form of a rectangle in its radially outer end section in a plane perpendicularly with respect to the radial direction, said rectangle having a width which corresponds to the width (measured in the circumferential direction) of the lever in said plane and a height which corresponds to the material thickness of the spring plate.

The ring region of the spring plate can be bent away in the axial direction to the supporting plate in its radially outer edge regions which are arranged between the transition sections of two levers which are adjacent in the circumferential direction. As a result of this design, in particular in conjunction and in association with a determination of force, the distribution of the mechanical stress can be of more uniform design or the stress which is produced at the point of highest mechanical stress can be optimized or limited.

According to a second aspect of the disclosure, an axial piston machine of swash plate design is provided which comprises a spring return apparatus according to the first aspect of the disclosure for elastically prestressing a multiplicity of sliding pads against a sliding bearing face of a pivotably mounted pivot cradle of the axial piston machine, which sliding pads are provided on foot-side end sections of working pistons which are mounted axially movably in cylinders of a cylinder barrel of a driving mechanism of the axial piston machine.

In one preferred development, the brackets are approximately as wide as or wider than the sliding pads in the circumferential direction and in each case have a through recess, into which the sliding pad can be inserted. Here, no force is transmitted from the bracket via its through recess onto the respective sliding pad.

In another preferred development having arms which are arranged between the sliding pads, said arms have a main section which extends radially from the inside to the outside and have a bent-back section which extends radially from the outside to the inside. Therefore, in the case of a given elasticity of the material of the spring plate (for example, metal sheet), which elasticity must not be too high in the bearing region with the neck of the cylinder barrel, the elasticity of the arms can be increased at the same time, since they are lengthened in a manner which saves installation space.

In one preferred refinement of the arms with a bent-back section, the width of the arm adjacently to the ring region is greater than in a transition region from the main section to the bent-back section. Furthermore, the width of the arm is greater in the transition region than in the end section. It is simple in terms of manufacturing technology if the width is reduced continuously here over the entire length of the arm.

The sliding pads are held on the swash plate in a particularly secure manner if a hold-down is arranged at the (preferably circular) outer edge of the supporting plate, which hold-down is fastened to the swash plate or to the pivot cradle. To this end, the diameter of the spring plate is smaller than the diameter of the supporting plate, with the result that the hold-down can engage over the edge of the supporting plate and minimum friction is produced during its rotation during operation of the axial piston machine.

BRIEF DESCRIPTION OF THE DRAWINGS

Embodiments of the disclosure will be explained in greater detail in the following text using diagrammatic drawings, in which:

FIG. 1B shows, at the top left, a plan view in the axial direction of a spring return apparatus according to the first embodiment in a variant without tapered sections of the levers, to the right of this a view of said spring return apparatus in the direction of the arrows "A" and, further to the right of this, a cross-sectional view in the sectional plane A-A and, below the plan view, a view of said spring return apparatus in the direction of the arrows "B" and, further below, a cross-sectional view in the sectional plane B-B, FIG. 4B shows, in a comparable illustration to FIGS. 1B and 1C, at the top left, a plan view in the axial direction of the spring return apparatus according to the fourth embodiment, to the right of this, a view of said spring return apparatus in the direction of the arrows "A" and, further to the right of this, a cross-sectional view in the sectional plane A-A and, below the plan view, a view of said spring return apparatus in the direction of the arrows "B" and, further below, a cross-sectional view in the sectional plane B-B, FIG. 5A shows, in the left-hand region, an enlarged perspective detail view of a spring plate of a spring return apparatus according to a fifth embodiment and, in the right-hand region, an enlarged cross-sectional view in the sectional plane A-A of the left-hand region, FIG. 5B shows, in a comparable illustration to FIGS. 1B and 1C, at the top left, a plan view in the axial direction of the spring return apparatus according to the fifth embodiment, to the right of this, a view of said spring return apparatus in the direction of the arrows "A" and, further to the right of this, a cross-sectional view in the sectional plane A-A and, below the plan view, a view of said spring return apparatus in the direction of the arrows "B" and, further below, a cross-sectional view in the sectional plane B-B.

DETAILED DESCRIPTION

Figure 1A:
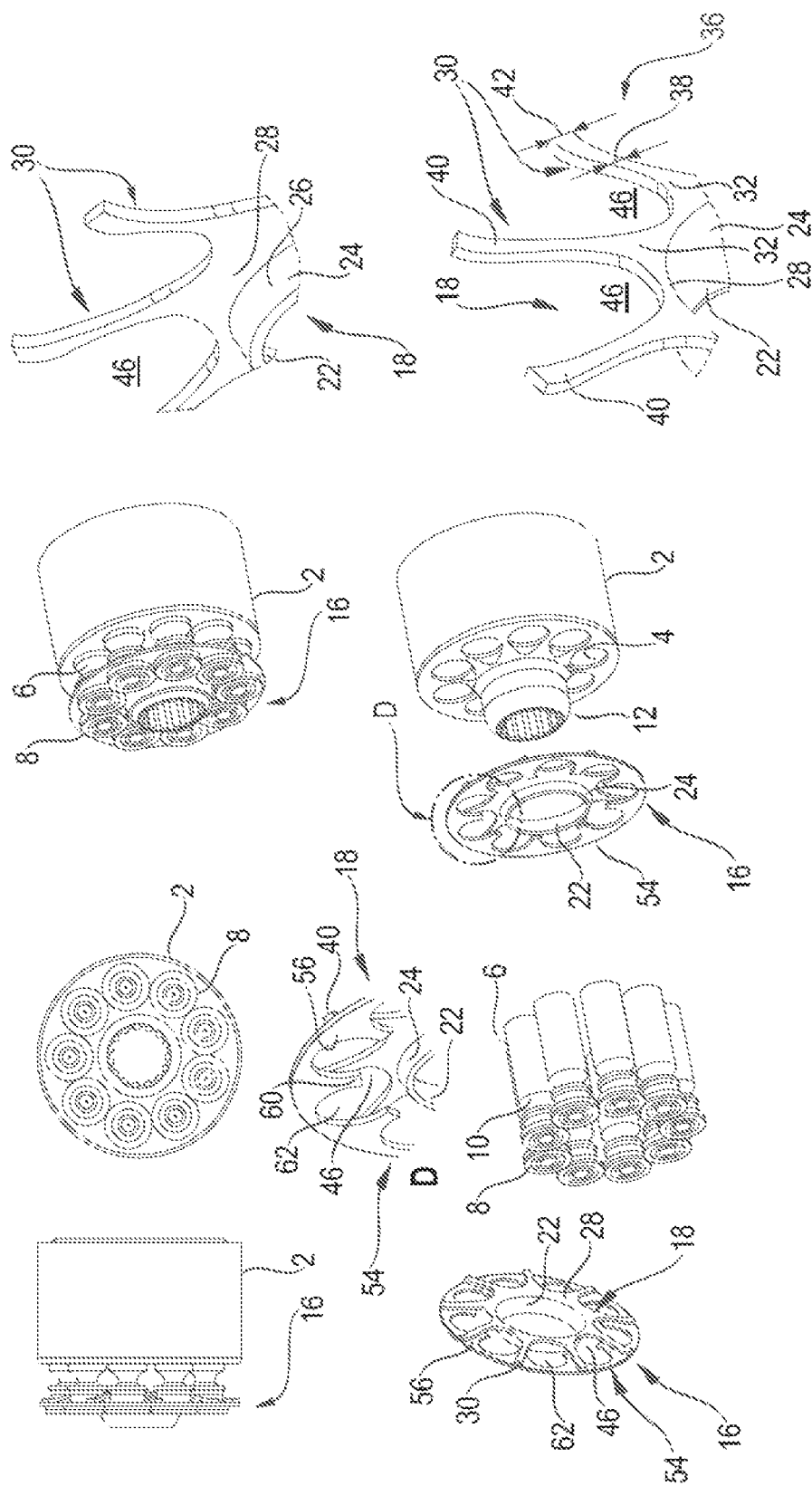
FIG. 1A shows, in the left-hand region, different views and illustrations of a spring return apparatus according to a first embodiment and its construction with sliding pads and a cylinder barrel of an axial piston machine and, in the right-hand region, two enlarged detail views with different perspectives of the spring plate of the spring return apparatus according to the first embodiment in a variant with tapered sections of the levers.

A common feature of the embodiments of the spring return apparatus 16; 116; 216 according to the disclosure which are shown in FIGS. 1 to 7 is that said spring return apparatus is of two-piece construction and comprises a spring plate 18; 118; 218 as first part and a supporting plate 54; 154; 254 as second part. The supporting plate 54; 154; 254 is arranged spaced apart axially from the spring plate 18; 118; 218 in the state of the latter, in which it is assembled with the working pistons 6, the sliding pads 8 and the cylinder barrel 2 of an axial piston machine (not shown), to be precise on the spring return apparatus 16; 116; 216 on that side of the spring plate 18; 118; 218 which faces away from the cylinder barrel 2. The spring plate 18; 118; 218 has a central opening 22, a ring region 28; 128; 228 which surrounds said opening 22, and a multiplicity of levers 30, brackets 130 or arms 230 which extend at least in sections radially to the outside from the ring region 28; 128; 228. The levers 30, brackets 130 or arms 230 are arranged spaced apart or distributed uniformly in the circumferential direction and are elastically flexible in the axial direction.

According to FIGS. 1 to 5, in each case two adjacent levers 30 delimit a receiving region 46 for receiving a tapered section 10 of a sliding pad 8 which is arranged on the piston foot. The supporting plate 54 has a circularly annular supporting region 56, on which radially outer end sections 40 of the levers 30 can be supported if the supporting plate 54 is arranged concentrically with respect to and axially adjacently to the spring plate 18. A radially inner edge region 24 of the spring plate 18, which radially inner edge region 24 delimits the opening 22 first of all, is reshaped, for instance by way of bending or hot bending, in such a way that a collar 26 is formed which is cylindrical in sections and merges via a curved region which surrounds the opening 22 into the circularly annular ring region 28, from which the levers 30 protrude substantially radially to the outside. Said curved region or transition region which surrounds the opening 22 between the collar 26 and the ring region 28 serves as supporting face of the spring plate 18 in an assembled state of the spring return apparatus 16 against a complementary bearing face 12 of the cylinder barrel 2, which bearing face 12 is preferably configured as a section of a spherical surface, through which cylinder barrel 2 a drive shaft (cf. FIG. 6A) of the axial piston machine can extend. The bearing face 12 is formed on a projection of the cylinder barrel 2, which projection is formed axially in the direction of the piston feet of the working piston 6 or in the direction of the sliding pads 8. If said supporting face of the spring plate 18 bears against the bearing face 12, the spring plate 18 is centered in relation to the cylinder drum 2 and the drive shaft.

Furthermore, the embodiments of the spring return apparatus 16 which are shown in FIGS. 1 to 5 have the following in common. Each of the levers 30 of the spring plate 18 is bent out of a plane of the ring region 28 in the axial direction toward the supporting plate 54. Each receiving region 46 between adjacent levers 30 is designed so as to receive a tapered section 10 of a working piston 6 or sliding pad 8 of the axial piston machine in the assembled state of the spring return apparatus 16, with the result that each lever 30 protrudes radially to the outside between two adjacent tapered sections 10 of the working piston 6 or the sliding pad 8. The supporting plate 54 comprises a multiplicity of drivers 60 which extend radially to the inside from the supporting region 56 and of which in each case two which are adjacent in the circumferential direction delimit a circular segment-shaped free region 62. Each free region 62 is designed such that, in the assembled state, a sliding pad 8 of the axial piston machine extends axially through it. Here, each driver 60 protrudes radially to the inside into an intermediate space between two adjacent sliding pads 8, with the result that the supporting plate 54 is driven in a rotational movement by the sliding pads 8 when the cylinder drum 2 rotates about its axis during operation of the axial piston machine.

Figure 1C:
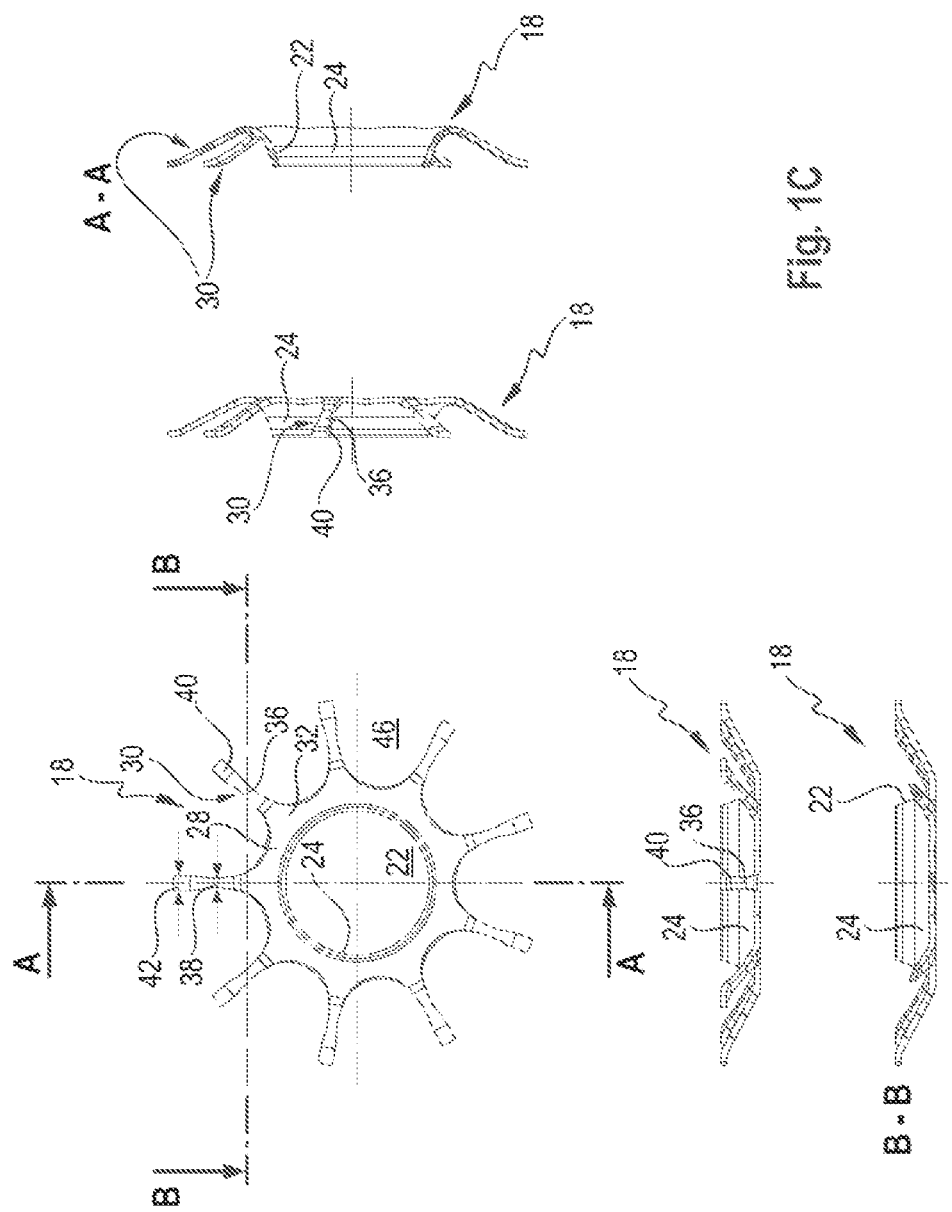
FIG. 1C shows, at the top left, a plan view in the axial direction of the spring return apparatus according to the first embodiment in the variant which is shown in FIG. 1A with tapered sections of the levers, to the right of this a view of said spring return apparatus in the direction of the arrows "A" and, further to the right of this, a cross-sectional view in the sectional plane A-A and, below the plan view, a view of said spring return apparatus in the direction of the arrows "B" and, further below, a cross-sectional view in the sectional plane B-B.
Figure 2:
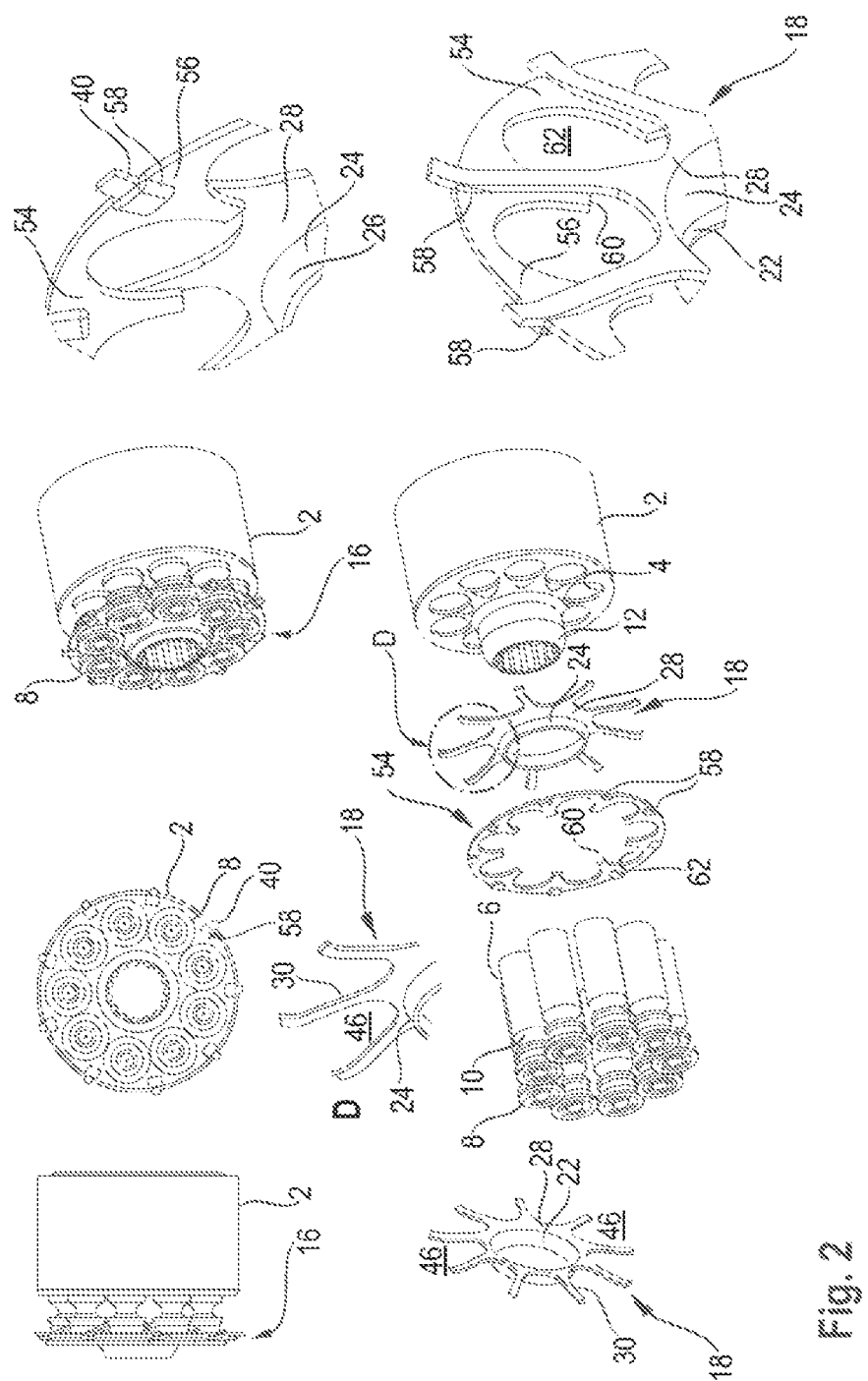
FIG. 2 shows, in a comparable illustration to FIG. 1A, in the left-hand region, different views and illustrations of a spring return apparatus according to a second embodiment and its construction with sliding pads and a cylinder barrel of an axial piston machine and, in the right-hand region, two enlarged detail views with different perspectives of the spring plate of the spring return apparatus according to the second embodiment.
Figure 3A:
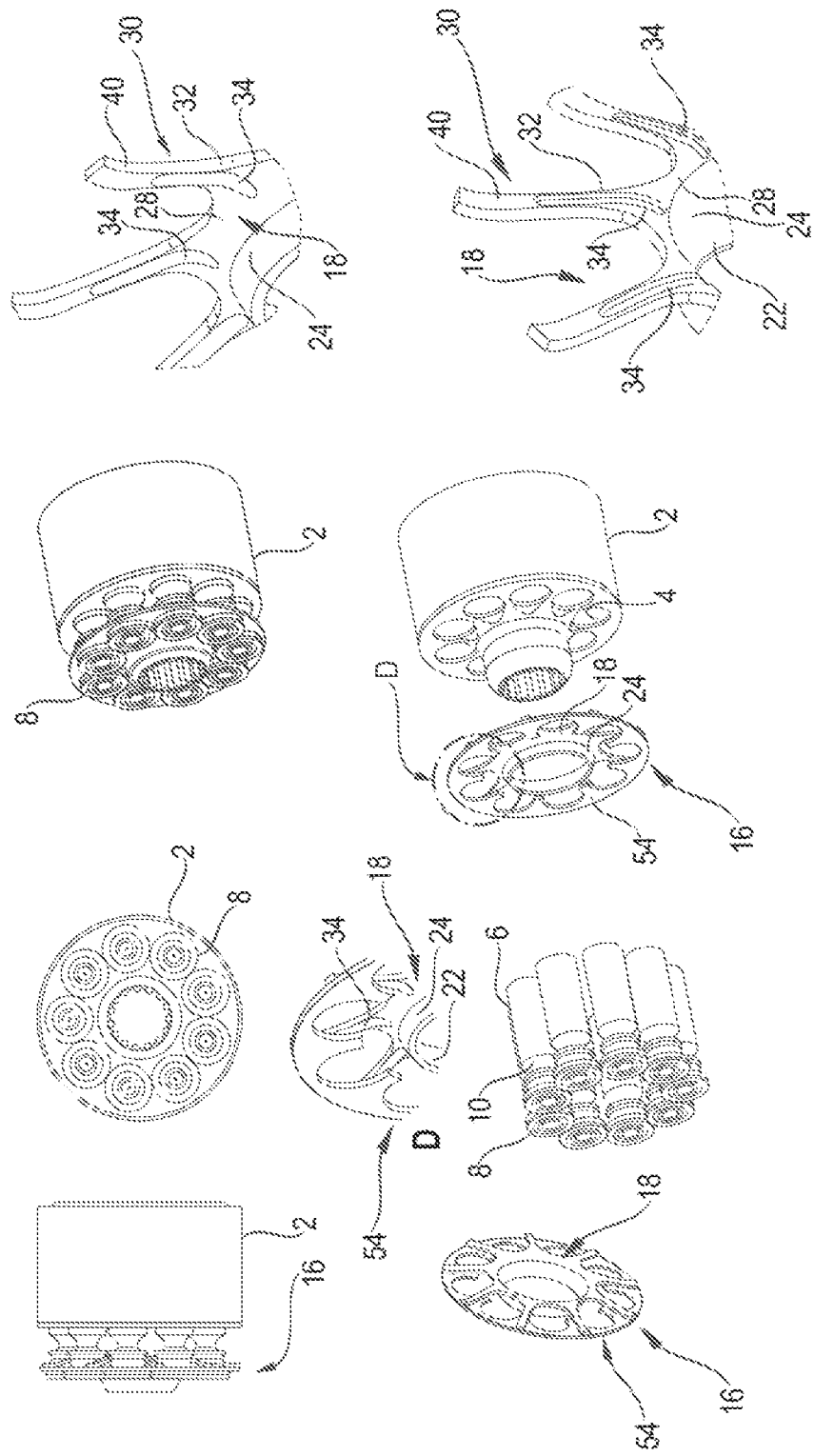
FIG. 3A shows, in a comparable illustration to FIG. 1A, in the left-hand region, different views and illustrations of a spring return apparatus according to a third embodiment and its construction with sliding pads and a cylinder barrel of an axial piston machine and, in the right-hand region, two enlarged detail views with different perspectives of the spring plate of the spring return apparatus according to the third embodiment.
Figure 3B:
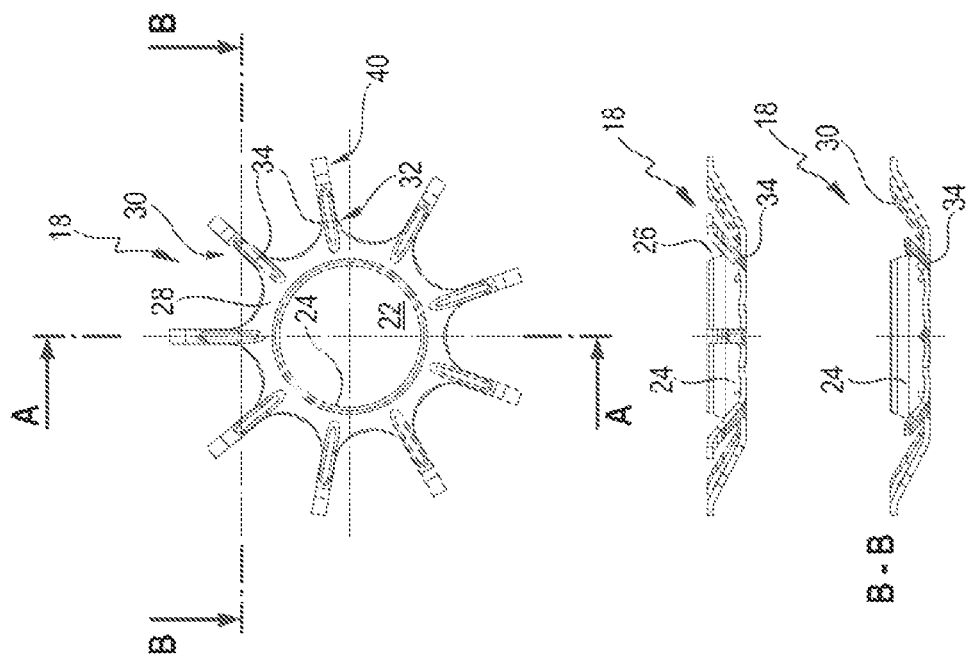
FIG. 3B shows, in a comparable illustration to FIGS. 1B and 1C, at the top left, a plan view in the axial direction of the spring return apparatus according to the third embodiment, to the right of this, a view of said spring return apparatus in the direction of the arrows "A" and, further to the right of this, a cross-sectional view in the sectional plane A-A and, below the plan view, a view of said spring return apparatus in the direction of the arrows "B" and, further below, a cross-sectional view in the sectional plane B-B.
Figure 4A:
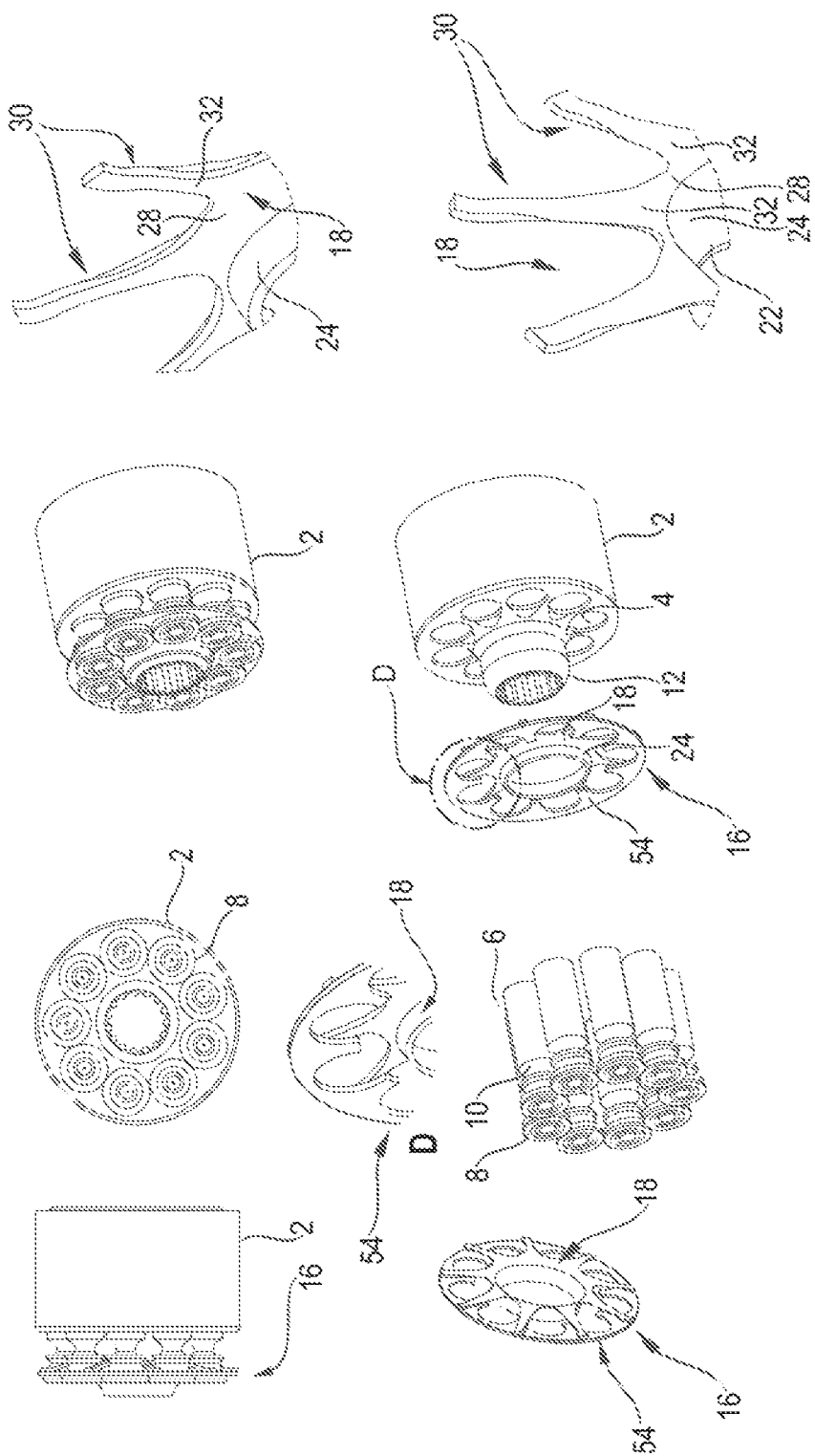
FIG. 4A shows, in a comparable illustration to FIG. 1A, in the left-hand region, different views and illustrations of a spring return apparatus according to a fourth embodiment and its construction with sliding pads and a cylinder barrel of an axial piston machine and, in the right-hand region, two enlarged detail views with different perspectives of the spring plate of the spring return apparatus according to the fourth embodiment.

Whereas, in the first variant (shown in FIG. 1B) of the first embodiment of the spring return apparatus 16, each lever 30 of the spring plate 18 has a substantially constant width in the circumferential direction radially outside its transition section 32, as can be seen best in the plan view in FIG. 1B, in the second variant (shown in FIGS. 1A and 1C) of the first embodiment, the levers 30 have a tapered section 36 between their radially inner transition section 32 and their radially outer end section 40, in which tapered section 36 a width 38 (measured in the circumferential direction) of the lever 30 is smaller than a width 42 (measured in the circumferential direction) of the lever 30 in the radially outer end section 40 of the lever 30, as shown, in particular, in FIG. 1A in the right-hand region in the lower illustration and in FIG. 1C in plan view.

In the second embodiment (shown in FIG. 2) of the spring return apparatus 16, the supporting plate 54 has, in its supporting region 56, a multiplicity of grooves 58 which extend in the radial direction and are arranged spaced apart uniformly in the circumferential direction. Each of said grooves 58 is configured and provided so as to receive a radial end section 40 of a lever 30 of the spring plate 18 in the assembled state of the spring return apparatus 16. Here, the external diameter of the supporting plate 54 is smaller than the external diameter of the spring plate 18 which is defined by the radially outer ends of the levers 30, as can be seen best in FIG. 2 in the right-hand region. The sense of said grooves 58 is that the spring plate 18 is driven reliably by them, the design of the levers 30 being substantially free or it being possible for it to be designed according to aspects which will be addressed further below. In the embodiments (shown in FIGS. 1 and 3 to 5) of the spring return apparatus 16 without grooves which are provided in the supporting plate 54, the spring plate 18 has to be driven directly by the sliding pads 8, by way of their contact on the levers 30, which reduces the flexibility in the design of the levers 30.

In the third embodiment (shown in FIGS. 3A and 3B) of the spring return apparatus 16, each lever 30 has a radially inner transition section 32 to the ring region 28. In each of said transition sections 32, a punched bead 34 which extends in the radial direction is formed, as can be seen well in FIG. 3A in the right-hand region in the upper illustration and in FIG. 3B in plan view. The shape, dimensions and/or positions on the lever 30 and/or in the transition region 32 of a punched bead 34 of this type can also be of different configuration to those shown in FIGS. 3A and 3B, for example, in relation to the length of the lever 30, longer or shorter, narrower or wider, narrower on the outside and wider on the inside, narrower on the inside and wider on the outside, with a smaller radius of curvature on the outside and a larger radius of curvature on the inside, or with a larger radius of curvature on the outside and a smaller radius of curvature on the inside.

By means of a punched bead 34 of this type, in particular by way of the variation of its length, width and/or depth, and/or by means of a tapered section 36, in particular by way of a variation of its width 38, the elasticity or the spring force of the levers 30 can be influenced or can be set to a desired magnitude in relation to bending in the axial direction, as occurs as a result of the axial movement of the working pistons 6 which are in engagement with the levers 30 of the spring plate 18 during operation of the axial piston machine.

In the fourth embodiment (shown in FIGS. 4A and 4B) of a spring return apparatus 16, each lever 30 of the spring plate 18 has a radially inner transition section 32 to the ring region 28. Each of the levers 30 has a cross-sectional area in the form of a substantially axially symmetrical circular ring section 48 in its transition section 32 in a plane perpendicularly with respect to the radial direction, as can be seen best in FIG. 4B in the cross-sectional view B-B. Here, in the assembled state of the spring return apparatus 16, the inner circle section 50 of the circular ring section 48 is arranged on that side of the spring plate 18 which faces the supporting plate 54.

In the fifth embodiment (shown in FIGS. 5A and 5B) of the spring return apparatus 16, the ring region 28 of the spring plate 18 is bent away in the axial direction toward the supporting plate 54 in its radially outer edge regions 52 which are arranged between the transition sections 32 of two levers 30 which are adjacent in the circumferential direction, as indicated by the arrows 64 in FIGS. 5A and 5B. By way of bending of this type of the radially outer edge regions 52 of the ring region 28, the distribution of the elastic stress can be influenced during bending of the levers 30 and, in particular, the point with the highest elastic stress can be optimized in the sense of stress dissipation at said point. Furthermore, instead of a possibly sharp contact edge on the edge region 28 of the spring plate 18, a "rounded" driving guide is formed, against which the sliding pads 8 bear in the assembled state of the spring return apparatus 16.

As an alternative to the stressing of the sliding pads 8 via their tapered sections 10, the sliding shoes 8 can also be stressed against the swash plate via a (simple) radial shoulder.

Figure 6A:
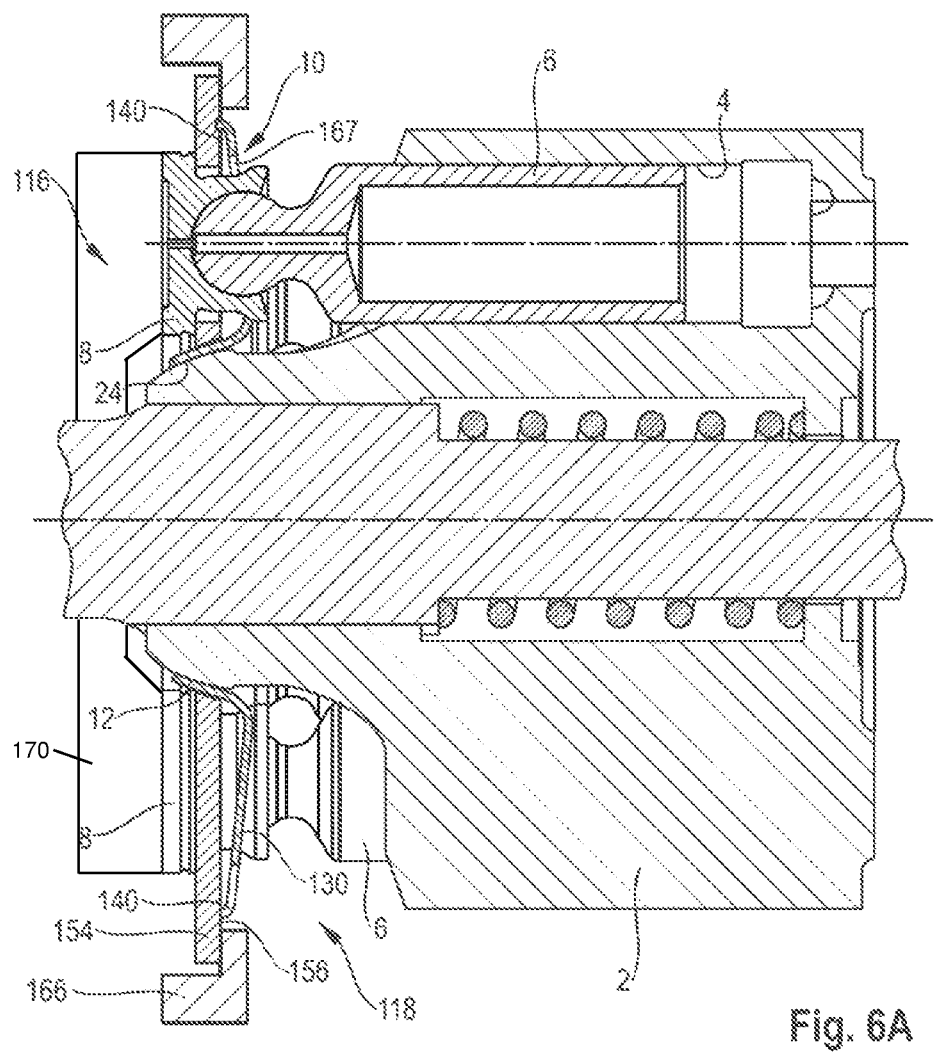
FIG. 6A shows a sixth exemplary embodiment of the spring return apparatus according to the disclosure with some essential parts of the axial piston machine in a longitudinal section.

FIG. 6A shows a sixth exemplary embodiment of the spring return apparatus 116 according to the disclosure together with the cylinder barrel 2, in the cylinders 4 of which in each case one working piston 6 is guided. Each working piston 6 has a piston foot, by way of which it is inserted in an articulated manner into a respective sliding pad 8. Each sliding pad 8 has a tapered section 10 or radial shoulder, against which the supporting plate 154 bears which stresses each sliding pad 8 (to the left in FIG. 6A) against the swash plate 170 (shown schematically), which is also referred to herein as a pivot cradle. The stressing force is applied to the supporting plate 154 by the spring plate 118, the spring plate 118 being supported in the above-described way by the edge region 24 of the opening 22 (cf. also FIG. 6B) on the cylinder barrel 2 and loading the supporting plate 154 via end sections 140. The end sections 140 are formed radially on the outside on the respective brackets 130 which are distributed uniformly on the circumference of the ring region 128 of the spring plate 118 and extend approximately in a star-shaped manner radially to the outside.

Figure 6B:
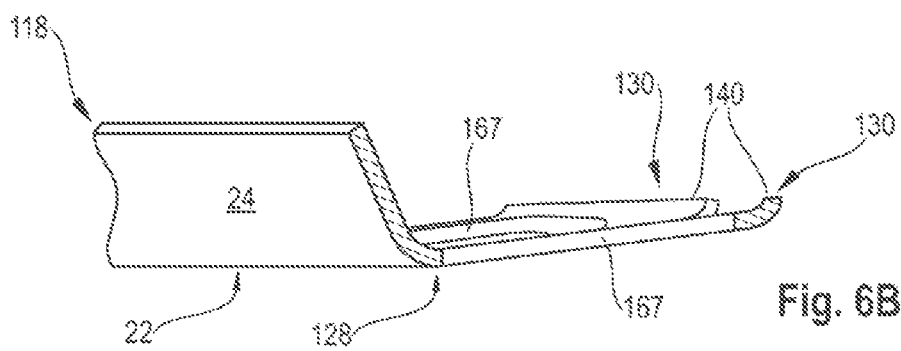
FIG. 6B shows a detail of a spring plate of the sixth exemplary embodiment of the spring return apparatus according to the disclosure in accordance with FIG. 6A.

FIG. 6B shows a detail of the spring plate 118. Here, a front bracket 130 is shown sectioned and a rear bracket 130 is shown partially in a view. It can be seen that the brackets 130 in each case have a through recess 167. Said through recess 167 is larger than the corresponding sliding pad 8 which extends through in each case one through recess 167. The brackets 130 of the second exemplary embodiment according to FIGS. 6A and 6B are wider than the levers 30 of the preceding exemplary embodiments.

Furthermore, FIG. 6A shows that, in the sixth exemplary embodiment, an outer edge of the supporting plate 154 is held via a circumferential hold-down 166 on the swash plate. The hold-down 166 is fastened to the swash plate.

Figure 7A:
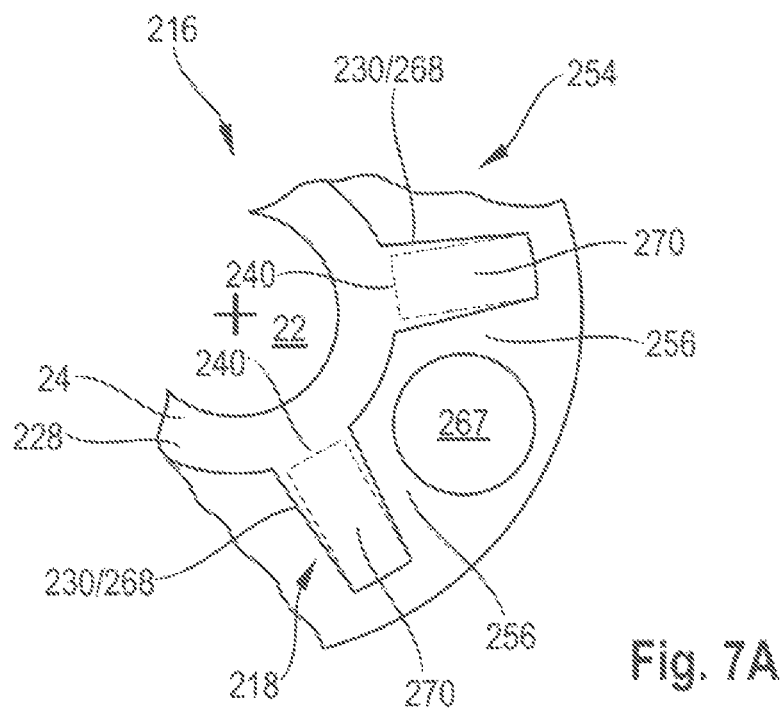
FIG. 7A shows a detail of a seventh exemplary embodiment of the spring return apparatus according to the disclosure in a plan view.

FIG. 7A shows a detail of a seventh exemplary embodiment of the spring return apparatus 216 according to the disclosure in a plan view. Here, a detail of the spring plate 218 is shown and, below this, a detail of the supporting plate 254 is shown. Levers or arms 230 which are once again distributed uniformly on the circumference extend from a ring region 228 of the spring plate 218 first of all radially to the outside. A bent-back section 270 which is attached to a respective main section 268 of the arm 230 extends counter to the main section 268 radially to the inside. It can be seen here that the width of each arm 230 decreases approximately constantly over the main section 268 and over the bent-back section 270.

Figure 7B:
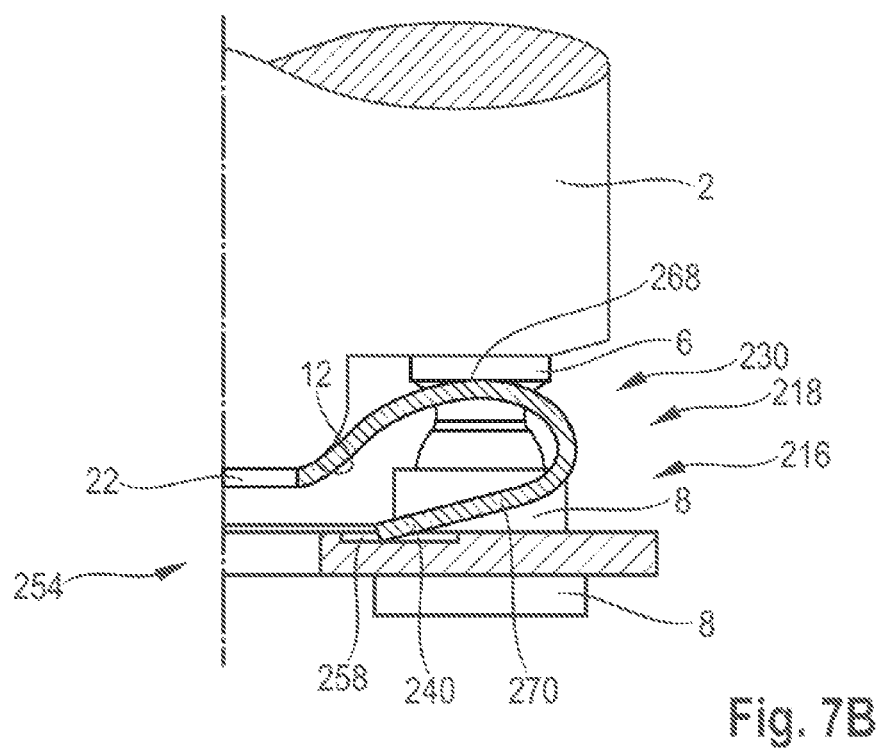
FIG. 7B shows a detail of the seventh exemplary embodiment according to FIG. 7A in a longitudinal section.

In the seventh exemplary embodiment according to FIGS. 7A and 7B, the sliding pads 8 are separated spatially from the arms 230. In more precise terms, a sliding pad 8 is arranged between in each case two arms 230, said sliding pad 8 not being in contact with the arms 230, in contrast to the exemplary embodiments according to FIGS. 1 to 5. Through recesses 267 are arranged uniformly distributed in the supporting plate 254, into which through recesses 267 in each case one sliding pad 8 is inserted, the sliding pads 8 being loaded via the edges of the through recesses 267 with their stressing force.

FIG. 7B shows a detail of the seventh exemplary embodiment according to FIG. 7A in a longitudinal section. Here, the cylinder barrel 2 and a small detail of a working piston 6 and its sliding pad 8 are shown additionally.

The arms 230 are not bent away, but rather curved. This results in a curved transition from the respective main section 268 to the respective bent-away section 270 on the radially viewed inner side of which the respective end section 240 is formed. Grooves 258 are provided distributed uniformly in the supporting plate 254, into which grooves 258 the respective end section 240 is inserted. The grooves 258 ensure that the spring plate 218 maintains a defined position with regard to the supporting plate.

What is claimed is:

1. A spring return apparatus configured to prestress a plurality of sliding pads against a sliding bearing face of a pivotably mounted pivot cradle of an axial piston machine, comprising:
    a drive shaft with a two-part element that includes:
        a spring plate having a central opening, a ring region surrounding the central opening, and a plurality of levers, brackets, or arms, each of which:
            extends radially to an outside, at least in sections, from the ring region;
            is positioned such that individual levers, brackets, or arms in the plurality of levers, brackets or arms are spaced apart or distributed uniformly in a circumferential direction; and
            is at least one of elastically flexible and elastically pivotable in an axial direction; and
        a supporting plate positioned concentric, axially adjacent, and axially offset with respect to the spring plate, the supporting plate including a supporting region, which supports end sections of the plurality of levers, brackets, or arms;
    wherein:
        the plurality of sliding pads are positioned on piston feet of working pistons mounted axially movably in cylinders of a cylinder barrel of the axial piston machine; and
        the cylinder barrel is fixedly connected to the drive shaft and thereby rotates with the drive shaft; and
    wherein prestressing the plurality of sliding pads against the sliding bearing face comprises a flow path of a force initiated by the cylinder barrel to the ring region of the spring plate, the spring plate then transfers the force radially outwardly through the levers, brackets, or arms of the spring plate, and to the supporting plate.

2. The spring return apparatus according to claim 1, wherein:
    the plurality of levers, brackets, or arms includes a plurality of levers;
    each set of two adjacent levers of the plurality of levers delimits a respective receiving region in which a respective tapered section of one of the working pistons or a respective one of the plurality of sliding pads is received;
    the supporting region of the supporting plate has a circularly annular shape; and
    the end sections are radially outer end sections of the plurality of levers.

3. The spring return apparatus according to claim 2, wherein:

the respective receiving region is configured substantially in a "U" shape; and the set of the two adjacent levers corresponds to limbs of the "U" shape of the respective receiving region.

4. The spring return apparatus according to claim 2, wherein:

a radially outer end section of at least one lever of the plurality of levers has a first width measured in the circumferential direction; and the at least one lever comprises a tapered section with a second width, measured in the circumferential direction, that is smaller than the first width.

5. The spring return apparatus according to claim 1, wherein:

the supporting plate further comprises a plurality of drivers which extend radially inwardly from the supporting region; and each set of two circumferentially adjacent drivers of the plurality of drivers delimits a respective free region having a circular segment shape.

6. The spring return apparatus according to claim 5, wherein the respective free region is configured such that:

one of the plurality of sliding pads extends axially through the respective free region; and each of the plurality of drivers protrudes radially inwardly into an intermediate space between a respective set of two adjacent sliding pads in the plurality of sliding pads.

7. The spring return apparatus according to claim 1, wherein the ring region defines a plane, and at least one of the levers, brackets, or arms comprises a bend out of & the plane of the ring region in an axial direction towards the supporting plate.

8. The spring return apparatus according to claim 1, wherein the plurality of levers, brackets, or arms includes a plurality of levers, each lever including:

a radially inner transition section at a transition to the ring region; and a punched bead which extends radially in the transition section.

9. The spring return apparatus according to claim 1, wherein the plurality of levers, brackets, or arms includes a plurality of levers, each lever including:

a radially inner transition section at a transition to the ring region, the transition section having a cross-sectional area shaped as an axially symmetrical circular ring section when viewed in a plane perpendicular with respect to a radial direction, wherein an inner circle section of the axially symmetrical circular ring section is arranged on a side of the spring plate which faces the supporting plate and an outer circle section is arranged on a side of the spring plate which faces away from the supporting plate.

10. The spring return apparatus according to claim 9, wherein the ring region is bent away in the axial direction toward the supporting plate in radially outer edge regions of the ring region which are located in the circumferential direction between transition sections of the plurality of levers.

11. The spring return apparatus according to claim 1, wherein the plurality of levers, brackets, or arms includes a plurality of brackets, each bracket including a through recess for a sliding pad.

12. The spring return apparatus according to claim 1, wherein the plurality of levers, brackets, or arms includes a plurality of arms, each arm including:

a main section which extends radially from an inside to the outside; and a bent-back section which extends radially from the outside to the inside.

13. The spring return apparatus according to claim 1, wherein:

a diameter of the spring plate is smaller than a diameter of the supporting plate; and a hold-down is positioned at an outer edge of the supporting plate and is fastened to a swash plate or to the pivot cradle.

14. The spring return apparatus according to claim 1, wherein the spring plate is non-planar.

15. The spring return apparatus according to claim 1, wherein the central opening defines a central axis of the spring plate, the ring region is located at least partially in a plane that is normal to the central axis, and the plurality of levers, brackets, or arms are located at least partially outside the plane.

16. A spring return apparatus configured to prestress a plurality of sliding pads against a sliding bearing face of a pivotably mounted pivot cradle of an axial piston machine, comprising:

a drive shaft with a two-part element that includes:

a spring plate having a central opening, a ring region surrounding the central opening, and a plurality of levers, brackets, or arms, each of which:

extends radially to an outside, at least in sections, from the ring region;

is positioned such that individual levers, brackets, or arms in the plurality of levers, brackets or arms are spaced apart or distributed uniformly in a circumferential direction; and is at least one of elastically flexible and elastically pivotable in an axial direction; and a supporting plate positioned concentric, axially adjacent, and axially offset with respect to the spring plate, the supporting plate including a supporting region, which supports end sections of the plurality of levers, brackets, or arms;

wherein:

the plurality of sliding pads are positioned on piston feet of working pistons mounted axially movably in cylinders of a cylinder barrel of the axial piston machine;

the cylinder barrel is fixedly connected to the drive shaft and thereby rotates with the drive shaft;

the supporting region further includes a plurality of grooves extending radially and distributed and spaced apart uniformly in the circumferential direction; and each groove in the plurality of grooves is configured to receive a respective one of the end sections.

17. A spring return apparatus configured to prestress a plurality of sliding pads against a sliding bearing face of a pivotably mounted pivot cradle of an axial piston machine, comprising:

a drive shaft with a two-part element that includes:

a spring plate having a central opening, a ring region surrounding the central opening, and a plurality of levers, brackets, or arms, each of which:

extends radially to an outside, at least in sections, from the ring region;

is positioned such that individual levers, brackets, or arms in the plurality of levers, brackets or arms are spaced apart or distributed uniformly in a circumferential direction; and is at least one of elastically flexible and elastically pivotable in an axial direction; and a supporting plate positioned concentric, axially adjacent, and axially offset with respect to the spring plate, the supporting plate including a supporting region, which supports end sections of the plurality of levers, brackets, or arms;

wherein:
the plurality of sliding pads are positioned on piston feet of working pistons mounted axially movably in cylinders of a cylinder barrel of the axial piston machine;
the cylinder barrel is fixedly connected to the drive shaft and thereby rotates with the drive shaft;
the plurality of levers, brackets, or arms includes a plurality of arms, each arm including:
a main section which extends radially from an inside to the outside; and
a bent-back section which extends radially from the outside to the inside;
each of the arms is wider in a region adjacent to the ring region than in a transition region at a transition from the main section to the bent-back section; and
each of the arms is wider in the transition region than at the end section.

\* \* \* \* \*

UNITED STATES PATENT AND TRADEMARK OFFICE
CERTIFICATE OF CORRECTION

PATENT NO. : 9,879,533 B2
APPLICATION NO. : 14/200105
DATED : January 30, 2018
INVENTOR(S) : Christian Spielvogel Page 1 of 1

It is certified that error appears in the above-identified patent and that said Letters Patent is hereby corrected as shown below:

In the Claims

In Column 11, Lines 29-33, Lines 1-5 of Claim 7 should read:
7. The spring return apparatus according to claim 1,
wherein the ring region defines a plane, and at least one of
the levers, brackets, or arms comprises a bend out of the
plane of the ring region in an axial direction towards the
supporting plate.

Signed and Sealed this
Twenty-seventh Day of March, 2018

Andrei Iancu
*Director of the United States Patent and Trademark Office*